United States Patent [19]

Swirbel et al.

[11] Patent Number: 5,576,855
[45] Date of Patent: Nov. 19, 1996

[54] LIQUID CRYSTAL DISPLAY HAVING EMBOSSED APPEARING CHARACTERS

[75] Inventors: Thomas J. Swirbel, Davie; Patrick M. Dunn, Coral Springs, both of Fla.

[73] Assignee: Motorola, Inc., Schaumburg, Ill.

[21] Appl. No.: 438,144

[22] Filed: May 8, 1995

[51] Int. Cl.$^6$ .................................................. G02F 1/1335
[52] U.S. Cl. .................................. 359/40; 359/63
[58] Field of Search .................... 359/40, 63, 73

[56] References Cited

U.S. PATENT DOCUMENTS

| | | | |
|---|---|---|---|
| 3,912,369 | 10/1975 | Kashnow | 359/63 |
| 4,023,259 | 5/1977 | Kubota et al. | 29/592 |

*Primary Examiner*—William L. Sikes
*Assistant Examiner*—James A. Dudek
*Attorney, Agent, or Firm*—Dale W. Dorinski

[57] ABSTRACT

A liquid crystal display is constructed by arranging two transparent substrates (1,1') in parallel fashion, using only one polarizer. The display has an active display area for displaying characters that have an embossed appearance. A single polarizer (8) is on the back side of one substrate (1), and a birefringent film (5) is on the front side of the other substrate (1'). The background (15) and the embossed appearing characters (10) have substantially the same appearance, but are differentiated from each other by a dark border (12), thus rendering the characters with an embossed appearance. The border has a substantially different appearance from the embossed appearing characters and the background, the border being preferably darker than the background. The transparency of the embossed appearing characters and the background are within about ±10% of the other.

14 Claims, 2 Drawing Sheets

5,576,855

LIQUID CRYSTAL DISPLAY HAVING EMBOSSED APPEARING CHARACTERS

TECHNICAL FIELD

This invention relates in general to liquid crystal display devices.

BACKGROUND

A liquid crystal display (LCD) generally consists of a layer of liquid crystal fluid (a substance which exists at a state between liquid and crystal), between two systems of electrodes. Typically, one or both of the electrodes are transparent and each of the systems is resident upon a transparent substrate. The two substrates are arranged in parallel fashion so as to form a sandwich. When electrodes are arranged so that selected portions of the electrodes may be energized while other portions remain neutral. An integrated circuit or driver is used to selectively energize the electrodes.

When the driver energizes the electrodes, the liquid crystal fluid between the electrodes exhibits hydrodynamic turbulence and disperses the light. The contrast between the dispersed light transmitted and/or reflected light, creates the figures or characters in the display.

Liquid crystal fluids are roughly classified as into three types; smectic, cholesteric, and nematic. The nematic type of liquid crystal fluid has proved to be the most useful for LCDs. The interior surface of each of the substrates in the LCD contains an alignment layer that has a series of minute grooves that are preferentially oriented in a given direction. The liquid crystal molecules immediately adjacent to each of the plates align themselves with the direction of orientation of an alignment layer, that is, they align themselves with the minute grooves. Those molecules that are between the plates orient themselves into a helix, the ends of which correspond with the alignment direction on each plate. When the plates are at right angles to each other, the helix makes one quarter of a turn which results in linearly polarized light traversing the cell being rotated through an angle of 90°. In the usual construction, the cell is sandwiched between an upper and a lower polarizing plate or polarizing filter. These polarizing plates are placed on the exterior side of each of the two substrates. Assuming the axes of the polarizing plates to be a right angles to each other, incident light will then be transmitted through the cell due to the optical activity of the liquid crystal material between the plates.

When the axes of the polarizing plates are parallel to each other, no light can traverse the cell. However, when an electric field is applied to the selected electrodes by the driver, the liquid crystal composite will lose its optical activity because the axis of the liquid crystal molecule aligns parallel to applied electric field. Because the polarizing filters are placed at right angles to each other, as the optical activity is lost from the selected portions of the fluid, those portions become opaque, while the remainder of the cell remains transparent. Of course, if the polarizing filters are parallel, the converse takes place.

Because the appearance of the character or element in the display is simply a change between transparent and opaque, the characters tend to have a flat, two-dimensional appearance. Efforts have been made to enhance the two-dimensional black and white appearance of LCDs by adding color filters and by other methods that introduce color into the display. However, the use of color filters results in a monochromatic display that still has a two-dimensional quality and color displays tend to be complex and expensive. It would be a significant addition to the art if a liquid crystal display could be fabricated that would provide an enhanced appearance without the added complexity and expense imposed by color LCDs.

DETAILED DESCRIPTION OF THE PREFERRED EMBODIMENT

Figure 1:
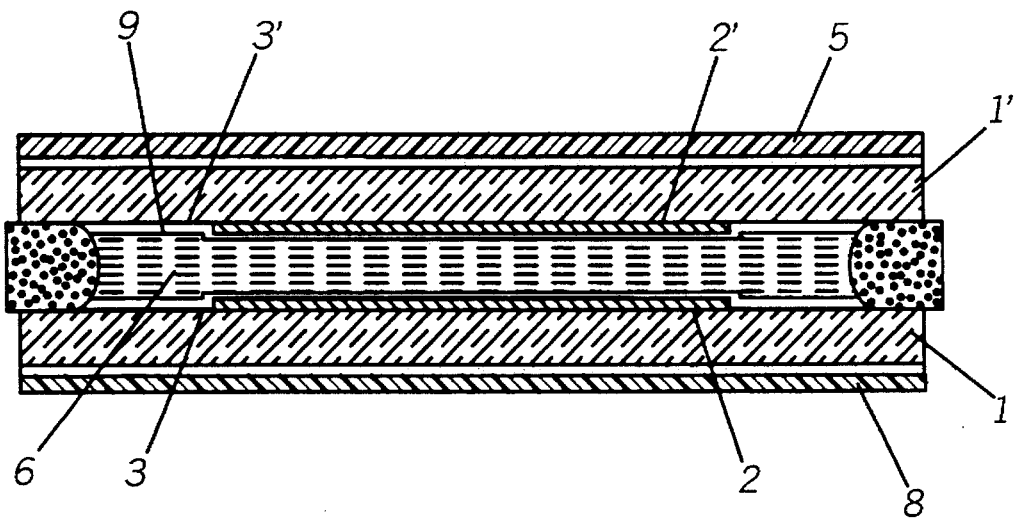
FIG. 1 is a cross sectional view of a liquid crystal display device n accordance with the invention.
Figure 3:
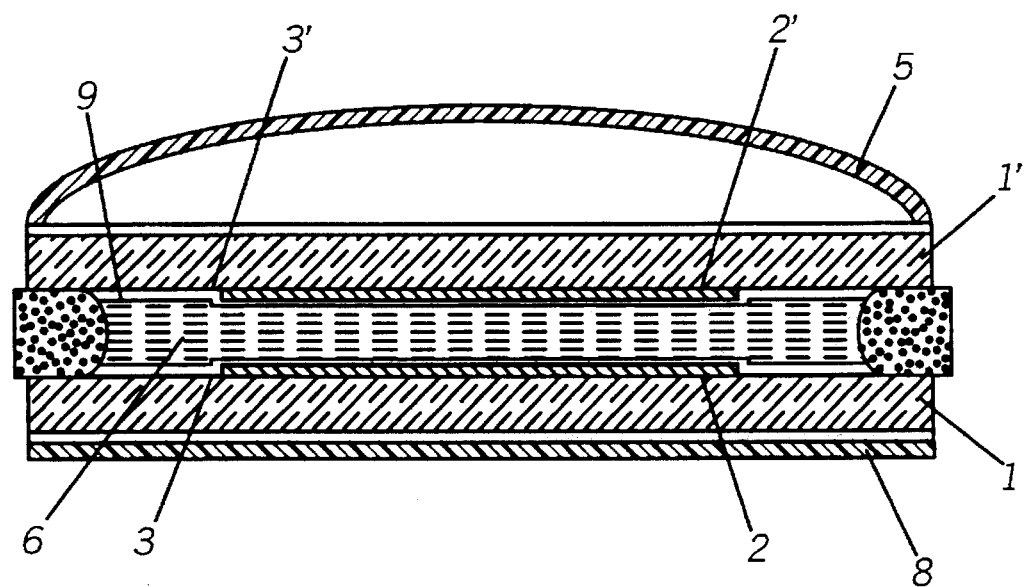
FIG. 3 is a cross-sectional view of an alternate embodiment of the invention.

A liquid crystal device creates an image by enabling light to be transmitted through certain regions of the display and blocking transmission through others. In order to view this difference in light transmission, the display must be polarized, typically by placing a polarizing film on both the front and rear of the display. The image characteristically is two dimensional, that is, it appears to be in the same plane as the display background. In most cases, the percent transmission of polarized light passing through the display is maximized to give optimum contrast, so differences greater than 50% are typical. On the other hand, if a traditional liquid crystal display is viewed with only a single polarizer, an image will not be present when the characters are energized. Briefly, according to the invention, a liquid crystal display device has characters that appear to the viewing eye to be embossed. Referring now to FIG. 1, the device is constructed by arranging two transparent substrates 1,1' in parallel fashion, to form a uniform gap 6 between them. A liquid crystal fluid 9 is situated in the gap to form an active display area for displaying the embossed characters. Each character is formed by energizing one or more electrodes 2 situated on the inside surface 3 of the substrate 1. A single polarizer 8 is on the back side of one substrate 1. On the front side of the other substrate 1', a birefringent means 5 is situated. The birefringent means replaces the polarizer normally found in a conventional LCD. The LCD displays the embossed appearing characters by using only one polarizer. In one embodiment of the invention, the background and the embossed appearing characters have substantially the same appearance. The embossed appearing characters are differentiated from the background by a dark border around each embossed appearing character, and the border has a substantially different appearance from the embossed appearing characters and the background. In the preferred embodiment, the border is darker that the background. The embossed appearing characters and the background have essentially the same appearance, with the transparency of one being within about ±10% of the other.

Figure 2:
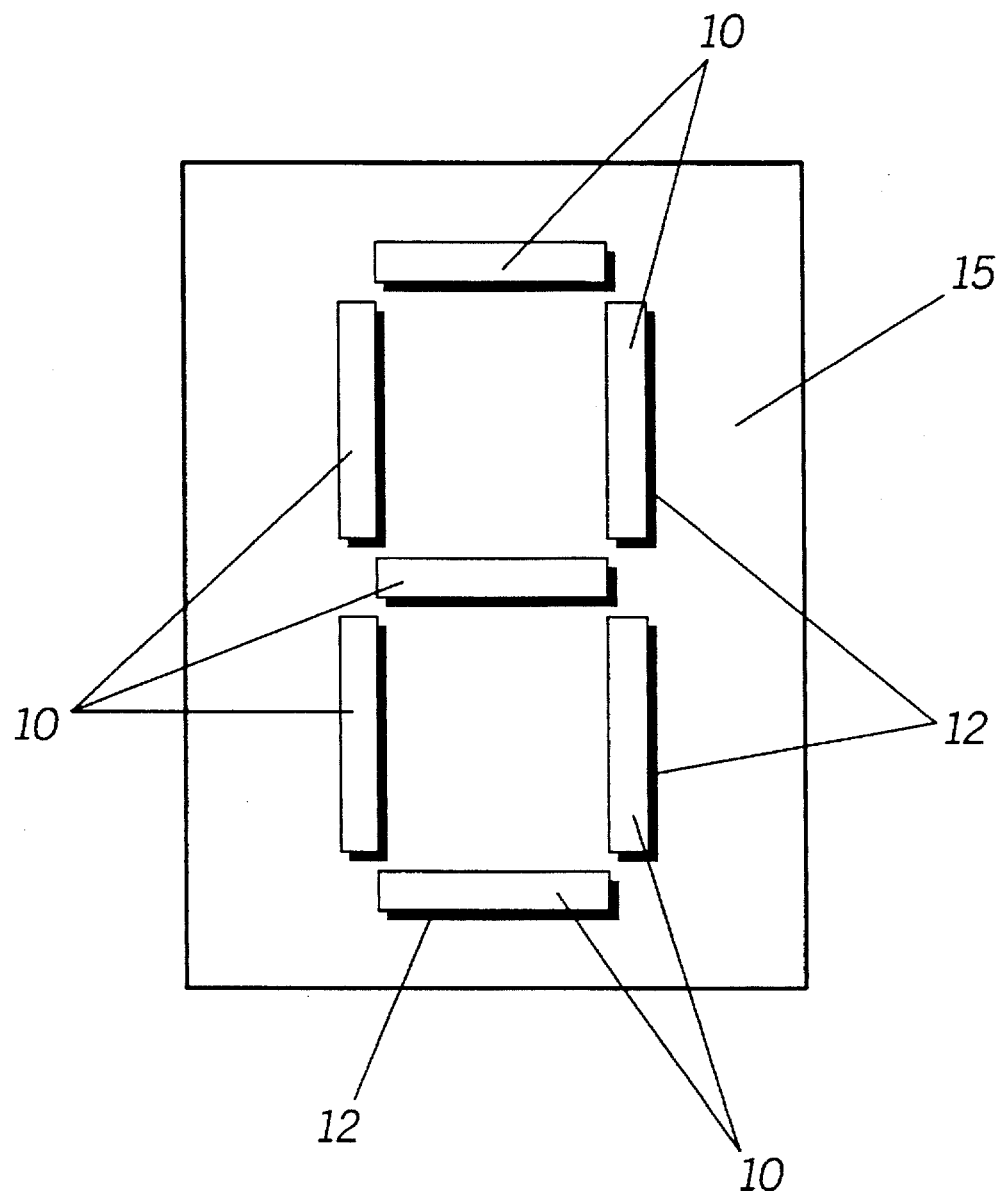
FIG. 2 is a representative illustration of liquid crystal display characters that have an embossed appearance, in accordance with the invention.

The embossed display is similar in some respects to a typical liquid crystal display in that a fluid is disposed between two transparent parallel substrates which have a transparent conductive film patterned to the desired image configuration. When a voltage is placed across the electrodes on each side of the plate, the fluid disposed between them changes its optical refractive index to produce a change in the light transmitted through it. However, to view the features on the display that have an embossed appearance, a polarizer is placed only on the rear substrate. A polarizing film is not used on the top substrate. Instead of a polarizing film, a birefringent filter is placed on the display's front surface. A birefringent filter is optically anisotropic, that is, the optical properties of the material are different in the x and y direction of the film. Light passing through the birefringent filter is split into two components, or is doubly refracted. In contrast, a polarizing film is said to have a defined axis of polarization. When two pieces of film are placed such that their polarization axes are at 90° to each other no light is transmitted through them. Now if an optically anisotropic, or birefringent, film is placed between these crossed polarizers at some angle theta, there is an optic axis (theta value) which can be defined as the direction which does not allow light to be transmitted. This means that the polarizers are still crossed, and the birefringent film has not rotated the polarization. When the birefringent film is rotated, there is another optic axis (theta value) which will allow the transmitted light to reach a maximum value. The angle between this axis and the first one (which did not allow transmission) is defined as the retardation angle of the film, and this angle will be dependent upon the wavelength of the light being attenuated. As this birefringent film is rotated there is a second axis defined as the retardation axis which will enable light to be transmitted. For example, a sheet of polyester which is birefringent will appear to be clear when viewed in white light at any angle. However, when this material is viewed with polarized light, the amount of transmitted light will change depending on the angle of light polarization and the optic or birefringent axis of the polyester. When such a material is placed on the front surface of the display the entire display is of a uniform color with the light transmission determined by the transmission of the rear polarizer. When a voltage is placed across selected characters, those characters appear to be embossed when viewed by the unaided eye. That is, they are perceived as if they were not in the same plane, or the same z-axis height, as the background or the non-energized characters. Additionally, the transparency of the embossed appearing characters and the background are within about ±10% of each other. A representative illustration of a display in accordance with the invention is shown in FIG. 2, where the edges of a seven segment display are shown in the embossed mode.

EXAMPLE 1

A twisted nematic (TN) liquid crystal display was constructed to be viewed not in conventional liquid crystal display mode, but in the embossed mode. The display was constructed with indium-tin oxide (ITO) electrodes formed on opposing faces of parallel glass plates. The ITO electrodes on both glass plates were coated with a polyimide alignment layer (DuPont 2555T). The alignment layers were rubbed such that the rub direction on the top plate was perpendicular to the rub direction of the alignment layer on bottom plate. After assembly, a liquid crystal fluid (Hoffman LaRoche, TN-7679) doped with 0.05% cholesteric material (Merck ZL811) was injected between the plates. A polarizing film was placed on the outside of the bottom plate, and a birefringent material was placed on the outside surface of the top plate. The birefringent film was then shaped along its retardation axis to form a convex curve having approximately a 0.5" radius, and was then oriented on the top display substrate with the concave side of the curve facing the substrate. The retardation axis of the curved birefringent film was at a 45° angle to the polarization angle of the rear polarizer. It should be noted that when the film was curved it then had some of the optical properties of a lens, that is when normal objects were viewed through it, they appeared to be somewhat distorted. A representative illustration of the appearance of the embossed characters 10 as viewed through the birefringent film is shown in FIG. 1. Upon applying a voltage to certain electrodes, the selected characters 10 had an embossed appearance when viewed with the unaided eye. The embossed characters 10 were defined by shadow lines 12 along one edge of each character. Additionally, the body of each character had a transparency which was within about 10% of the transparency of the background 15 and non selected characters.

EXAMPLE 2

A super twisted nematic (STN) liquid crystal display was constructed to be viewed not in conventional liquid crystal display mode, but in the embossed mode. The display was constructed with indium-tin oxide (ITO) electrodes formed on opposing faces of parallel glass plates. The ITO electrodes on both glass plates were coated with a polyimide alignment layer (DuPont 2555T). The alignment layers were rubbed such that the rub direction of the top plate was 220° to the rub direction of the alignment layer on bottom plate. After assembly a mixture of a liquid crystal fluid (Merck 5100 and 5200) doped with 0.85% Merck ZL811 cholesteric material was injected between the plates. Subsequently a polarizing film was placed on the rear plate. The birefringent film was then formed along its retardation axis to create a curve having approximately a 0.5" radius, as in Example 1, and was then oriented on the top display substrate such that the retardation axis was at a 45° angle to the polarization angle of the rear polarizer. Upon applying a voltage to certain electrodes, the selected characters had an embossed appearance when viewed. The embossed characters 10 were defined by shadow lines 12 along one edge of each character, and appeared to be in a separate plane as compared to the background 15 of the display. Additionally, the body of each character had a transparency which was within 10% of the transparency of the background and non selected characters. A representative illustration of the appearance of the embossed characters is shown in FIG. 1.

In summary, a novel liquid crystal display device has an image that has an embossed appearance to the viewer. The display can be used in the transmissive mode, or can employ a reflector on the backside to operate in the reflective mode. The displayed image has a three dimensional appearance, as opposed to the flat, two-dimensional appearing displays of the prior art. While the preferred embodiments of the invention have been illustrated and described by way of example, it will be clear that the invention is not so limited. Numerous modifications, changes, variations, substitutions and equivalents will occur to those skilled in the art without departing from the spirit and scope of the present invention as defined by the appended claims.

What is claimed is:

1. A transmissive liquid crystal display device with characters having an embossed appearance, comprising:

first and second transparent substrates arranged in parallel fashion, forming a uniform gap between them;

a liquid crystal fluid disposed in the uniform gap, to form an active display area for displaying an embossed character having an appearance of being embossed from a background that appears substantially the same as the character, the character having a border that appears substantially darker than the background;

the liquid crystal display device having a sole polarizer disposed on an exterior face of the first substrate;

birefringent means disposed on an exterior face of the second substrate; and whereby the liquid crystal display device displays the embossed appearing characters using only one polarizer.

2. The liquid crystal display device of claim 1, wherein the birefringent means comprises a birefringent film.

3. The liquid crystal display device of claim 1, wherein the birefringent means comprises a birefringent lens.

4. The liquid crystal display device of claim 1, wherein the birefringent means is concave to the exterior face of the second substrate.

5. The liquid crystal display device of claim 1, wherein the transparency of the background is within about ±10% of the transparency of the embossed appearing character.

6. The liquid crystal display device of claim 1, wherein the liquid crystal fluid is nematic.

7. The liquid crystal display device of claim 1, wherein the device is a super twisted nematic display.

8. A liquid crystal display device that operates to display characters that appear to be embossed, comprising:

first and second glass substrates arranged in parallel fashion, an exterior face of the second substrate forming a viewing surface;

a nematic liquid crystal fluid disposed in a uniform gap between the substrates, to form a viewing area for displaying one or more embossed appearing characters on a background;

a single polarizer disposed on an exterior face of only the first substrate;

birefringent means disposed on the viewing surface of the second substrate;

the background and the embossed appearing characters have substantially the same appearance;

the embossed appearing characters differentiated from the background by a dark border around each embossed appearing character, the border having a substantially different appearance from the embossed appearing characters and the background; and the liquid crystal display device displaying the embossed appearing characters using only a single polarizer.

9. The liquid crystal display device of claim 8, wherein the transparency of the background is within about ±10% of the transparency of the embossed appearing character.

10. The liquid crystal display device of claim 8, wherein the birefringent means comprises a birefringent film.

11. The liquid crystal display device of claim 8, wherein the birefringent means comprises a birefringent lens.

12. The liquid crystal display device of claim 11, wherein the birefringent means is concave to the exterior face of the second substrate.

13. The liquid crystal display device of claim 8, wherein the embossed appearing character is differentiated from the background by a border around the embossed appearing character, the border having a substantially different appearance from the embossed appearing character and the background.

14. The liquid crystal display device of claim 8, wherein the device is a transmissive device.

* * * * *